(No Model.)
J. COWEN.
SPROCKET WHEEL.
No. 568,837.  Patented Oct. 6, 1896.
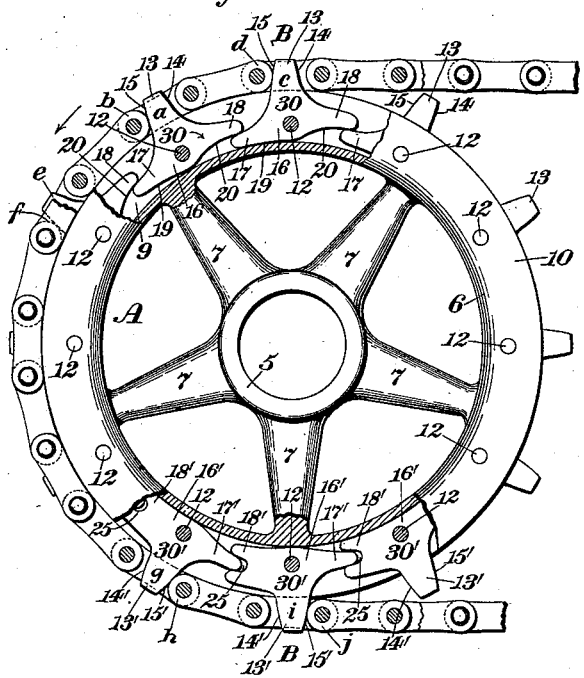
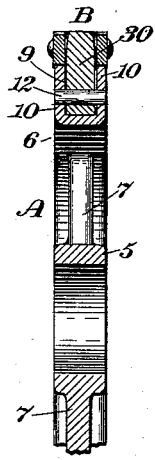
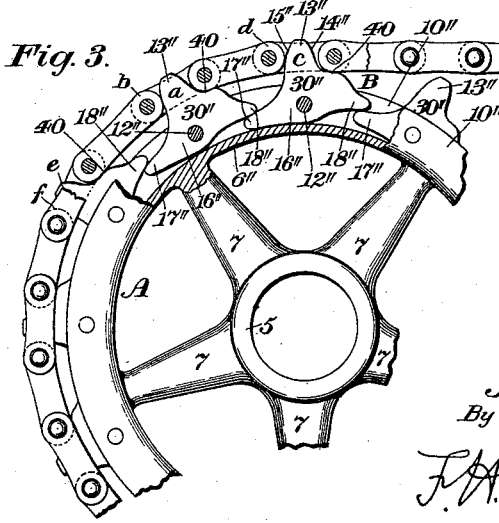
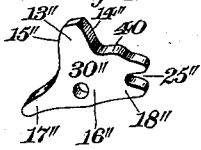
Witnesses:
J. L. Edwards Jr.
Fred. J. Dole.
Inventor:
John Cowen.
By his Attorney,
F. A. Richards.

UNITED STATES PATENT OFFICE.

JOHN COWEN, OF HARTFORD, CONNECTICUT.

SPROCKET-WHEEL.

SPECIFICATION forming part of Letters Patent No. 568,837, dated October 6, 1896.

Application filed June 19, 1896. Serial No. 596,157. (No model.)

*To all whom it may concern:*

Be it known that I, JOHN COWEN, a citizen of the United States, residing in Hartford, in the county of Hartford and State of Connecticut, have invented certain new and useful Improvements in Sprocket-Wheels, of which the following is a specification.

This invention relates to sprocket-wheels, and is more particularly designated as a "compensating" sprocket-wheel; and the object of the invention is to provide an improved wheel of this character having a series of movable or oscillatory members in the nature of teeth or sprockets operable to compensate for the wear and the imperfections in the chain-links or in said teeth or sprockets, and whereby the jumping of the chain, due to backlash and other causes, will be prevented and the easy and smooth running of the same secured, and whereby, also, the friction thereof will be reduced to the lowest possible degree.

In the drawings accompanying and forming part of this specification, Figure 1 is a side view, partly in section, of a sprocket-wheel carrying a part of a bicycle-chain, the same sprocket-wheel being herein shown, for the purposes of this specification, provided with two forms of sprockets, one construction thereof being disposed at the upper portion of said wheel and the other construction thereof at the lower portion of the same and said wheel turning in the direction of the arrow. Fig. 2 is a partly axial sectional view of said sprocket-wheel and chain. Fig. 3 is a side view, partly in section, of a portion of a sprocket-wheel provided with a different form of sprocket; and Fig. 4 is a perspective view of a sprocket detached from a wheel, showing one of its projections having a recess therein.

Similar characters designate like parts in all the figures of the drawings.

It is a well-known fact that in practice, owing to the impossibility of obtaining a sprocket-wheel in which the teeth or the sprockets thereof are perfectly formed and equidistantly disposed relatively to each other, and also to the impossibility of obtaining perfectly-formed and equidistantly-disposed chain-links, as well as on account of the wear of such teeth or sprockets and the links of the chain, the wheel-chain has a tendency to jump, which necessarily causes a hitching action thereof, and consequently impedes the free, easy, and smooth running of the same; and, therefore, in order to overcome these disadvantages, which are quite serious ones in the operation, for instance, of a bicycle, and not only compensate for the wear of the above-mentioned parts but also to provide for the inequalities or irregularities in the teeth or sprockets and links, I have provided an improved sprocket-wheel the teeth or sprockets of which are operable not only to take up the wear but also to compensate for, or overcome the imperfections of, the chain-links or sprockets, and thus permit all of the teeth that are in working position to engage the chain-links simultaneously, and whereby the friction which usually results when only a few of the sprockets that are in working position engage the chain will be equalized or divided, and hence reduced to a great extent, so that a free and smooth running chain and a machine having an easier action is obtained.

As a preface to the description of this improved device it will be understood that while this sprocket-wheel is more particularly adapted for use in connection with bicycles, yet the same can be used with all classes of machinery where sprocket-wheels and link-chains are used; but for the purposes of this specification the same will be described in connection with a velocipede. It will also be understood that this character of sprocket-wheel may be used on the driving-wheel and also in connection with the pedal-shaft of a velocipede, but it is herein shown simply as in use in connection with a pedal-shaft.

In a general way this improved sprocket-wheel comprises a wheel (designated generally by A) having a series of movable radial members (designated in a general way by B) and which members have a peripheral, curvilinear, or oscillatory movement with or in a direction opposite to the movement of the wheel, whereby the imperfections in such members or in the links of the chain or the wear of such members and links can be compensated for by such oscillatory members, and whereby, also, one member will act upon its companion members and so on throughout the series to bring the working faces thereof into engagement with the chain-links.

In the preferred form thereof herein shown and described the wheel preferably comprises the usual hub or spoke-sleeve 5 and rim or spoke-flange 6, said hub and flange being connected by a series of radial spokes 7, all of which parts in this class of sprocket-wheels are usually integral with each other, although it is of course understood that these parts of the wheel can be made in any desired and suitable way. The rim or flange 6 in one construction thereof is shown bifurcated or recessed and is preferably substantially U-shaped in cross-section, thereby forming an annular recess or way 9 for the reception of the radial members hereinafter described. It will be understood, however, that this flange or rim might be made in any other desired and suitable way for the reception of such movable members.

In one form thereof herein shown and described these movable members B, which constitute the teeth or sprockets 30 of the wheel, are pivotally secured in position intermediate the parallel sides 10 of the annular recessed rim or flange by means of suitable fastening means—such as studs or pivots 12—whereby such members will have an edgewise or oscillatory movement relatively to the wheel. In one form thereof shown each member comprises the usual spur 13, having the working faces 14 and 15 and the base 16, which base in this construction is provided with or embodies two extending projections 17 and 18, (shown herein having curved under sides or faces 19 and 20, one of which, as 19, when the sprockets are assembled, is adapted to engage the curved bottom wall of the annular way or recess 9, whereby the movement or play of the sprocket will be limited.) A portion of the curved under face 20 of the opposite projection 18 is adapted to engage the upper face of a projection 17 of a companion sprocket for the purpose hereinafter set forth. In assembling this particular construction of sprockets they are so disposed relatively to each other that the series of projections extending in one direction, as 18, will extend over or overlap the series of projections which extend in the opposite directions, as 17, so that each sprocket will have one of its projections, as 18, overlapping a projection of a companion sprocket and its opposite projection, as 17, extending under or overlapped by the projection of another companion sprocket for the purpose hereinafter specified, whereby the projections of each sprocket will be in alternating engagement with the top and under faces of the projections of two companion sprockets.

In another form thereof herein shown each movable member or sprocket 30' is provided with the usual spur 13', having working faces 14' and 15', and with a base 16', having or embodying a pair of oppositely-extending projections 17' and 18', one of which, as 18', in this form of wheel is provided with a recess 25 for the reception of a projection, as 17', of its companion sprocket, such recesses being disposed at the same point in each sprocket, whereby the series of sprockets are so disposed that a solid projection alternates with a recessed projection, the sprockets being substantially similar in all other respects to the sprockets described in connection with the other half of the wheel.

In another form of sprocket-wheel herein shown the flange of the wheel 6″ has its parallel sides 10″ of less width, whereby the chain will be entirely supported by the form of sprocket hereinafter set forth and be held out of engagement with such rim, so that the friction which results from the usual contact between the sprocket-wheel flange and the chain will be avoided. In this form of wheel the movable members or sprockets 30″ are substantially similar to the sprockets hereinbefore described and comprise a spur 13″, having working faces 14″ and 15″ and a base 16″, provided with or embodying a pair of oppositely-extending projections 17″ and 18″. In order, however, to receive the pressure of the chain and support the same away from the rim, each sprocket 30″ is provided with an extension or bearing portion 40 above one of its projections, as 18″, and preferably of a contour substantially similar to the contour of the end of a chain-link, whereby such link end can rest on and be supported by said bearing portion, and thereby be held away from the flange-rim; and in order to permit this the sides 10″ of the rim or flange will be of less width than the sides 10, (shown in Fig. 1,) as above set forth, whereby the sprockets will project a sufficient distance beyond such parallel sides 10″ of the flange to permit the chain to be entirely carried by its spur and the bearing portion 40 thereof, so that any irregularity in the spacing of the chain, whereby it may vary at different portions of its length, will be provided for, and thus the friction between the chain and sprocket-flange of the wheel avoided. Furthermore, by means of these movable members the chain will be kept at all times in its proper working position—that is to say, should one link be slightly longer or shorter than a companion link the sprocket will move into forward or rearward position to permit the bearing portion thereof to engage the link and hold it in its working position. This construction of sprocket may also be provided with a recess 25″ similar to the recess 25 of the sprockets 30' of the wheel shown in Fig. 1, if desired.

It will be understood that any construction of sprocket whereby the same will have a bearing portion or extension for the chain-link could be used in place of that herein shown and described, if desired.

In the operation of this improved sprocket-wheel, according to any of the forms of construction of the teeth or sprockets herein shown, presuming that the wheel is rotating in the direction of the arrow, the sprockets 30 will be oscillated by the movement of such wheel when they are carried into their chain-engaging position, so that, for instance, the working face 15 of the sprocket *a* will first engage the end of a link *b* of the chain and will then be caused to oscillate or react by said chain, owing to the fact that the wheel is moving in one direction and the load on the chain is pulling in the opposite direction, so that its projection 18 will engage the projection 17 of the following companion sprocket, as *c*, which will be forced into position to have its working face 15 engage the link *d* of the chain, and which sprocket will also in turn be oscillated in a similar manner to have its projection 18 engage the projection 17 of the next sprocket 30, and so on around the series, thereby bringing each sprocket into working position relatively to the chain to thus compensate for the wear and imperfections of the sprocket or the chain-link, and thus causing each sprocket to perform its proper share of the work and thereby dividing or equalizing the friction and by so doing reduce the same. Simultaneously with the oscillation or reaction of the sprocket *a* its forward projection 17 has a tendency to hold the sprocket *e* by means of its projection 18 into engagement with the forward link *f*, so that it will be seen that throughout the entire series of working sprockets the spur 13 of each sprocket will be held in engagement with some one of the links of the chain, so that the jumping of said chain, due to backlash or other cause, will be absolutely prevented in the operation of this improved sprocket-wheel. In the construction shown in the lower half of the sprocket-wheel the operation is substantially similar, the sprocket *g*, for instance, having its working face 15' in engagement with the link *h*, whereby it is oscillated into position by the chain to have its projection 17' oscillate the working face 15' of the sprocket *i*, by means of the walls of the recess 25, into engagement with a link *j*, and so on throughout the series.

It will be understood that any other desired form and construction of sprockets or teeth adapted to accomplish the same purpose may be used in connection with the wheel, and hence I do not desire to limit myself to the particular structures thereof herein shown and described.

Having described my invention, I claim—

1. A sprocket-wheel having a movable member provided with a pair of oppositely-extending projections, one of which projections is provided with a recess.

2. A sprocket-wheel having an annularly-recessed rim or flange having a series of members pivotally secured therein, each of said members having a pair of oppositely-extending projections and one of said projections having a recess therein for the reception of a projection of a companion sprocket.

3. A sprocket-wheel having a series of movable members, each having oppositely-extending projections and each having a projection alternately disposed above and below a projection of its companion sprockets and adapted to engage the same.

4. A sprocket-wheel provided with a movable member having a pair of oppositely-extending projections and a bulging portion or extension above one of said projections and constituting a bearing portion adapted to support a chain-link.

5. A sprocket-wheel provided with a movable member having a pair of oppositely-extending projections, one of which has a recess, and said movable member also having a bearing portion or extension adapted to support a chain-link.

6. A sprocket-wheel having an oscillatory sprocket comprising a spur and a base provided with or embodying oppositely-disposed projections, one of which has a recess therein, said sprocket also having a bearing portion or extension above one of its projections and adapted to support a chain-link.

7. A sprocket comprising a spur and a base provided with or embodying oppositely-disposed projections, one of which has a recess therein.

8. A sprocket comprising a spur and a base provided with or embodying oppositely-disposed projections, said sprocket having a bulging portion or extension intermediate of one of the faces of said spur and of one of the projections, thereby forming a bearing portion adapted to support a chain-link.

JOHN COWEN.

Witnesses:
 FRED. J. DOLE,
 HENRY BISSELL.